United States Patent
Moradell et al.

(10) Patent No.: US 6,648,412 B2
(45) Date of Patent: Nov. 18, 2003

(54) AUTOMOBILE VEHICLE SEAT FEATURING A HINGE MECHANISM ATTACHED TO A FLANGE ON THE SEAT BACK OR SEAT PAN BY A JOINING SYSTEM

(75) Inventors: Pierre Moradell, Saint Georges des Groseilliers (FR); Yann Reubeuze, Landigou (FR); François Cillierre, La Selle la Forge (FR)

(73) Assignee: Faurecia Sieges d' Automobile S.A., Boulogne (FR)

( * ) Notice: Subject to any disclaimer, the term of this patent is extended or adjusted under 35 U.S.C. 154(b) by 54 days.

(21) Appl. No.: 09/880,088

(22) Filed: Jun. 14, 2001

(65) Prior Publication Data
US 2002/0021035 A1 Feb. 21, 2002

(30) Foreign Application Priority Data
Jun. 15, 2000 (FR) .............................. 00 07603

(51) Int. Cl.$^7$ ................................. B60N 2/02
(52) U.S. Cl. ................. 297/354.12; 411/107; 411/399; 411/354; 403/374.3
(58) Field of Search .................. 297/354.1, 354.12, 297/362; 411/107, 84, 399, 354, 366.1; 403/408.1, 373, 374.1, 374.2, 374.3

(56) References Cited

U.S. PATENT DOCUMENTS

| 3,823,526 A | | 7/1974 | Rose |
| 4,730,967 A | * | 3/1988 | Warkentin .................. 411/103 |
| 4,941,787 A | * | 7/1990 | Shaffer ........................ 411/136 |
| 5,104,190 A | * | 4/1992 | Siegrist ........................ 297/362 |
| 5,139,361 A | * | 8/1992 | Camuffo .................. 403/408.1 |
| 5,297,851 A | * | 3/1994 | Van Hekken .......... 297/452.14 |
| 5,538,377 A | * | 7/1996 | Stewart et al. ............... 411/174 |
| 6,164,684 A | * | 12/2000 | Lehman .................... 280/728.2 |

FOREIGN PATENT DOCUMENTS

| DE | 39 05 688 | 8/1990 |
| EP | 0 943 489 | 9/1999 |
| FR | 2734609 | 11/1996 |
| GB | 400887 | 11/1933 |
| GB | 898925 | 4/1962 |

* cited by examiner

Primary Examiner—Peter M. Cuomo
Assistant Examiner—Stephen Vu
(74) Attorney, Agent, or Firm—Connolly Bove Lodge & Hutz LLP

(57) ABSTRACT

A hinge joining system for an automobile seat includes a seat back flange and a seat pan flange. A hinge mechanism is attached to one of the flanges. An assembly fastener component is connected to the hinge mechanism and passes through an opening in the selected flange, the opening including a raised tapered collar. A thrust component is connected to the assembly fastener component, the thrust component having a bore for radially gripping the raised tapered collar and axially pressing the collar against the selected flange. The assembly fastener component has a tapered male section fitting into the tapered collar, and the bore of the thrust component is also tapered for gripping the tapered collar between the bore and the tapered male section when the thrust component is pressed against the selected flange.

7 Claims, 2 Drawing Sheets

AUTOMOBILE VEHICLE SEAT FEATURING A HINGE MECHANISM ATTACHED TO A FLANGE ON THE SEAT BACK OR SEAT PAN BY A JOINING SYSTEM

FIELD OF THE INVENTION

This invention concerns joints between two parts or more, and aims at improving the mechanical strength of such joints, particularly in cases where at least one of the assembled parts is relatively thin, such as the joining of a sheet metal part to another more rigid part. It applies to joints between various parts used in the frames of automobile seats, and notably the joining of a hinge mechanism between the seat back and seat pan to a flange on the seat back or pan. Such hinge mechanisms, moreover, are well known and provide possibilities of adjusting the tilt angle of the seat back with respect to the seat pan, and locking it in various positions.

BACKGROUND OF THE INVENTION

These joints are conventionally made by welding, riveting, bolting or crimping.

Welded joints generally display good mechanical strength, but welding processes cannot be used, for example, to assemble dissimilar metals such as aluminium parts to steel parts. Furthermore, welding cannot be used to join painted or coated parts or, for example, to assemble two parts of an automobile seat that have already been padded.

The other methods of assembly sometimes do not ensure adequate mechanical strength, particularly when one of the parts, such as the flange, is thin.

In automobile seat applications, the joint between the mechanisms hinging the seat back on the seat pan and pan frames made of relatively thin sheet metal must be particularly strong and free of any play liable to create grating noises or any other form of discomfort.

We know, for example, of bolted attaching systems in which the hinge mechanism comprises two half-shells, usually in the form of a disk, that are interconnected and can pivot with respect to each other around the pivoting axis of the seat back, and comprising between them, in a manner known in itself, the mechanical components for position adjustment and locking. Each half-shell is attached to the corresponding frame of the seat back or pan by shouldered bolts, aligned parallel with the axis and therefore subjected to shear stresses under the forces tending to pivot the seat back. The inevitable play between the bolts and the seat pan or seat back frames is eliminated by the tightening of the bolts, creating friction between the hinge mechanism and the sheet metal frame. However, the duration of absence of play depends on controlling bolt tightness and the friction at the interfaces, which is impossible to achieve in practice under mass production assembly conditions.

We know of yet other attaching systems in which the hinge mechanisms feature in addition tapered bosses on the outer face of the half-shells, which fit into raised collars provided on the sheet metal of the seat back or seat pan, to avoid the risk of play between the hinge mechanism and the seat frame. A bolted attachment is then applied, for example, on other bosses provided for this purpose. The elimination of play in this case results from the tapered boss coming into contact with an internal edge of the corresponding collar, which risks leading to the development of play due to plastic deformation of the very limited area of contact. Moreover, the areas used for tightening and those used for positioning to eliminate the play, are different, and in principle are distributed around the circumference. The consequence of this is that the flatness tolerances of the parts and the relative flexibility of the frame sheet metal do not always ensure good tapered boss-to-collar contact on all the bosses.

We also know, through document FR-A-2734609, of a system for joining one part to another thin part, for example a thin sheet, by means of an assembly component connected to the first part and passing through a hole in the second part, and a thrust component connected to the said assembly component such that it is applied axially against the second part to push it up against the first. In order to increase the cross-sectional area subjected to shear stresses when a force is directed along the plane of the contact surface between the parts, the hole features a raised collar formed directly in the sheet metal of the second part, which is gripped radially in a bore made in the thrust component, such as a nut.

We also know, for example through document DE-A-1217144, of sheet metal attaching systems using a bolt or taper-headed stud placed in a raised collar made on a sheet, where the bolt head abuts axially on the rounded edge between the sheet and the raised collar. The part to be attached to the plate is held against the sheet by a nut screwed onto the said bolt. The nut is shaped so as to bear against the second part only around the collar and not directly on it. Alternatively, a conventional nut can be used, but in this case with the addition of a special bell-shaped washer that covers the collar without actually pressing on it. This system does not however solve the problem of lateral play that might subsist or appear between the assembled parts when the assembly is in service.

BRIEF DESCRIPTION OF THE INVENTION

The aim of this invention is to provide a solution to the problems mentioned above, in particular for attachments on relatively thin sheets such as seat frame flanges. It aims more specifically at improving the strength of joints made using assembly components that pass through the assembled parts, notably in the direction transverse to the axis of the assembly component. It also aims at preventing any lateral play between the assembled parts and the means of assembly, and guaranteeing this absence of play even further to repeated shear loads in alternating direction, such as those to which the hinges between an automobile seat back and pan are exposed, and this without complicating the assembly operations.

With these aims in view, the subject of the invention is an automobile seat featuring a seat back flange and a seat pan flange linked by a hinge mechanism attached to at least one of the said flanges by a joining system comprising at least one assembly component connected to the hinge mechanism and passing through a hole in the flange, said hole featuring a raised collar that is gripped radially in a bore made in a thrust component connected to the assembly component such that it applies axial thrust against the flange, characterised in that the raised collar is tapered, at least in part, the assembly component features a tapered male section of appropriate diameter to fit into the tapered collar when the hinge mechanism is assembled with the flange, and the bore of the thrust component is also tapered to form a female tapered section that grips the tapered collar of the said bore and the said male tapered part when the thrust component is pressed up against the flange.

The raised collar preferably has an apex taper angle of between 15 and 30°.

This angle is preferably of the roughly same value as that of the tapered part of the assembly component, which means that the assembly component fits into the raised collar with slight play to begin with, then tends to centre automatically as the two tapered sections fit together.

The dimensions and tapers of the bore of the raised collar and the tapered section of the assembly component are such that, at least during the first assembly, the hinge mechanism abuts against the flange before the female cone of the collar tightens on the male cone of the assembly component. In the most common application of the invention, where several Joining systems are used to assemble the mechanism on the flange, this guarantees correct and constant positioning of these two parts in the direction of the hinge axis, for all the joining systems.

The dimensions and tapers of the bore of the raised collar and the tapered section of the assembly component are also such that, when the two parts are bearing against each other in their final assembly position, there is no lateral play whatsoever between the raised collar and the assembly component. On the other hand, the lateral play existing between the smaller diameter part of the male tapered section and the larger diameter section of the collar at the start of fitting, ensures the fitability, that is to say allows at least the start of engagement of the male tapered section in the collar, even if the collar and the assembly component are not perfectly aligned, which can happen frequently owing to the manufacturing tolerances of each part, when the two parts are assembled at several points as indicated above, or when their relative positioning is otherwise ensured.

The taper of the bore of the thrust component enables it to fit easily over the tapered external surface of the collar and if necessary to press the said collar axially until the flange abuts on the mechanism, then radially press the collar between the male cone of the assembly component and the female cone of the thrust component causing plastic deformation of the said collar, which is designed to be deformable for this very purpose.

If the collar is centered exactly on the assembly component and the thrust component, and has the same taper, there is simply compressive plastic deformation of the collar material between the components.

In the event of misalignment, taper defects, or even an intentional difference in the tapers of the tapered section of the assembly component and the collar, the gripping of the thrust component causes plastic deformation of the collar in order to take up the lateral play and ensure an adequate contact area between the tapered sections to prevent any later plastic deformation that could cause such play to develop again. One can thus, for example, give the collar a different pre-assembly taper to that of the tapered section of the assembly component, or even make a virtually cylindrical collar, and then make use of its deformability, so that during assembly it is pressed by the thrust component and perfectly matches the taper of the tapered male section of the assembly component.

If there is an offset between the axes of the collar and the assembly component, the deformability of the collar can also compensate for this by moving laterally in its entirety with respect to the flange, to fit precisely over the tapered part of the assembly component connected to the hinge mechanism.

Whatever the case, the plastic deformation of the collar creates a stress on the thrust component that will jam it and prevent any future loosening.

In a preferential arrangement, the assembly component is threaded, for example such as a stud fixed to the hinge mechanism, and the thrust component is a nut. The thrust component could nevertheless be riveted to the assembly component.

In a complementary preferential arrangement, the stud has a head and a bushing that carries the said tapered section and abuts against the hinge mechanism when the head is joined to the hinge mechanism. The stud head is preferentially riveted to the hinge mechanism.

In other arrangements:

the stud is fixed on a boss of the hinge mechanism, with the flange in axial abutment on the boss.

the nut has a tapered seat in which is cut a tapered bore.

Other characteristics and advantages will be presented in the description given as an example of one method of producing the invention, and its application to the assembly of the hinge between an automobile seat pan and back.

BRIEF DESCRIPTION OF THE FIGURES

Refer to the appended drawings in which.

DETAILED DESCRIPTION OF THE INVENTION

Figure 1:
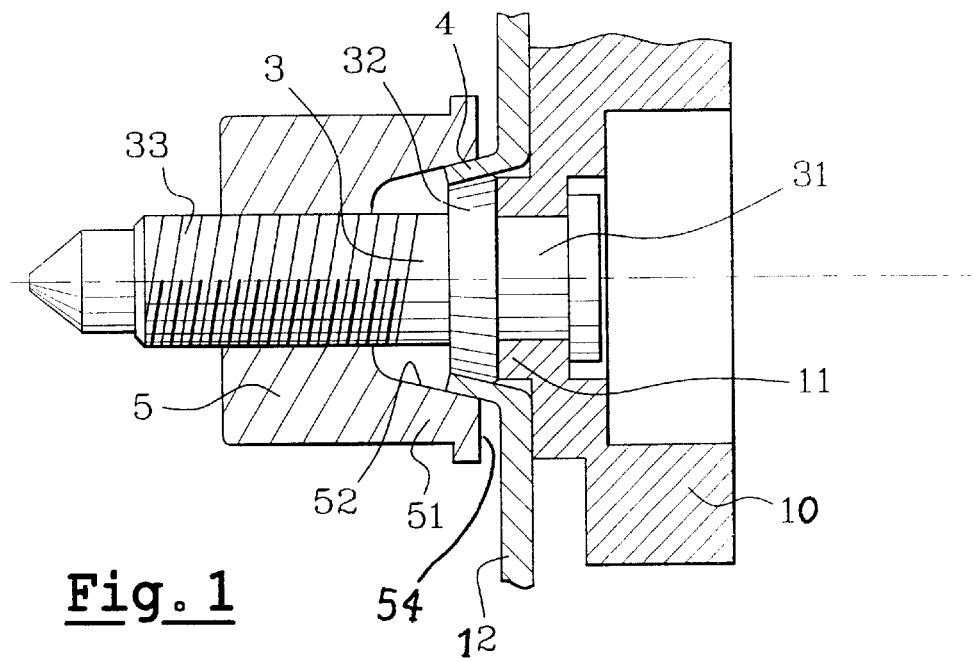
FIG. 1 is a cross-sectional view of a joint in compliance with the invention.

The drawing in FIG. 1 illustrates a joint between one part, which can be thick and mechanically strong, such as the half-shell of hinge mechanism 10, and another thin part consisting of a seat back frame flange 12, in sheet metal for example, displaying lower mechanical strength, and liable among other things, to display geometrical deformation or at least have dimensional variations if mass-produced. These two parts are joined by an assembly component such as a stud 3, and a thrust component, such as a nut 5.

Flange 12 features a raised collar 4 formed for example by stamping. The raised collar 4 forms a tapered ring extending from flange 12 on the opposite mechanism 10 over a distance of a few millimeters for example, and has an apex taper angle of about 22 degrees.

Stud 3 features:

a head 31 inserted through a bore made in a boss 11 of mechanism 10.

a truncated tapered bushing 32, whose largest diameter face abuts axially on boss 11, and a threaded portion 33.

The stud is attached to mechanism 10 by, for example, riveting of its head 31 on the side of the mechanism half-shell opposite boss 11, or by bolting, welding or any other suitable means of joining.

The outside diameter of boss 11, and the larger diameter of the truncated tapered bushing 32, are smaller than the largest diameter of the hole defined by the raised collar 4, as can be seen in the figure, in order to enter freely and allow plane-to-plane contact between flange 12 and mechanism 10.

After making the assembly, but before tightening nut 5, and with flange 10 and mechanism 12 applied against each other, the truncated tapered bushing is inserted with zero or minimal play into the orifice of collar 4, and can even be slightly force-fitted under the thrust of the nut at the start of tightening.

Nut 5 works in conjunction with the thread of stud 3. Nut 5 has a peripheral ring 51 delimiting an internal tapered bore 52 in which collar 4 enters without radial play when the nut is tightened on stud 3. The taper of bore 52 is roughly the same as that of collar 4, but its diameter is determined such that, when the nut is screwed onto stud 3 and engaged on collar 4, the tapers jam inside each other before the front face of the nut 54 bears against flange 12. In addition, the height of ring 51, that is to say the depth of bore 52, is greater than the height of the collar. Consequently, tightening nut 5 obligatorily results in the pressing of the collar against the tapered surface of the stud, eliminating any play and any risk of later development of play between mechanism 10 and flange 12.

Figure 2:
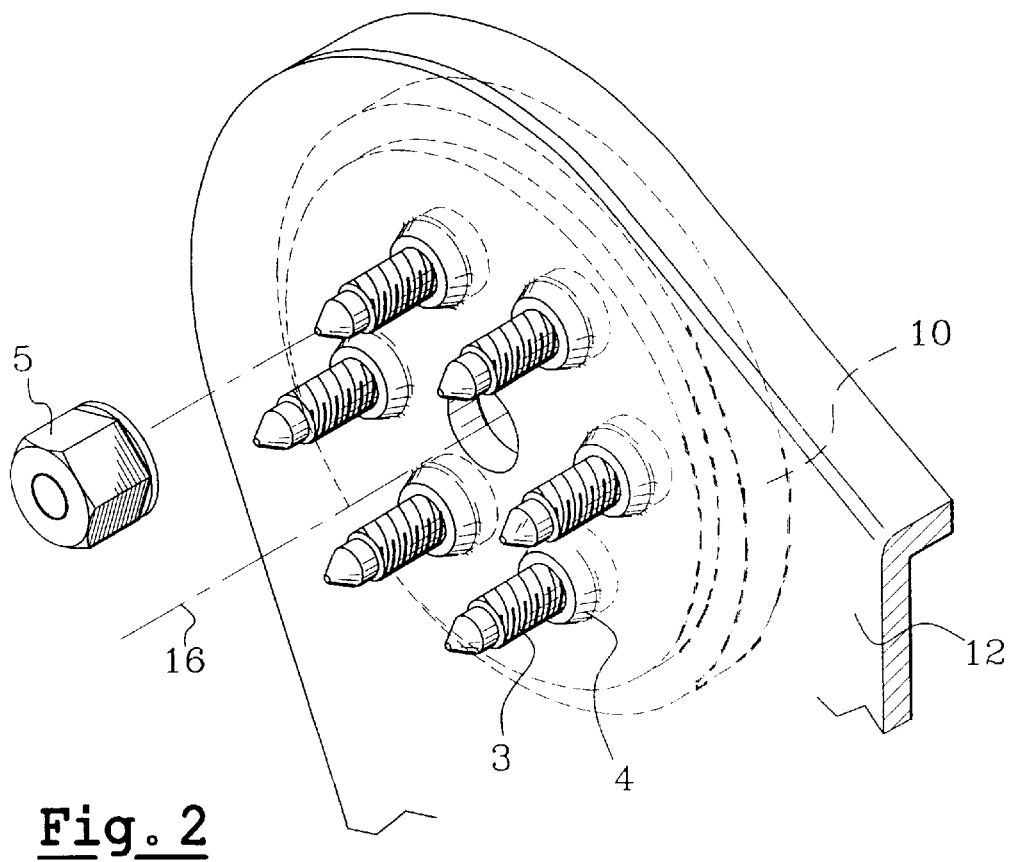
FIG. 2 is a schematic perspective view of the hinge of an automobile seat using joints in compliance with the invention.
Figure 3:
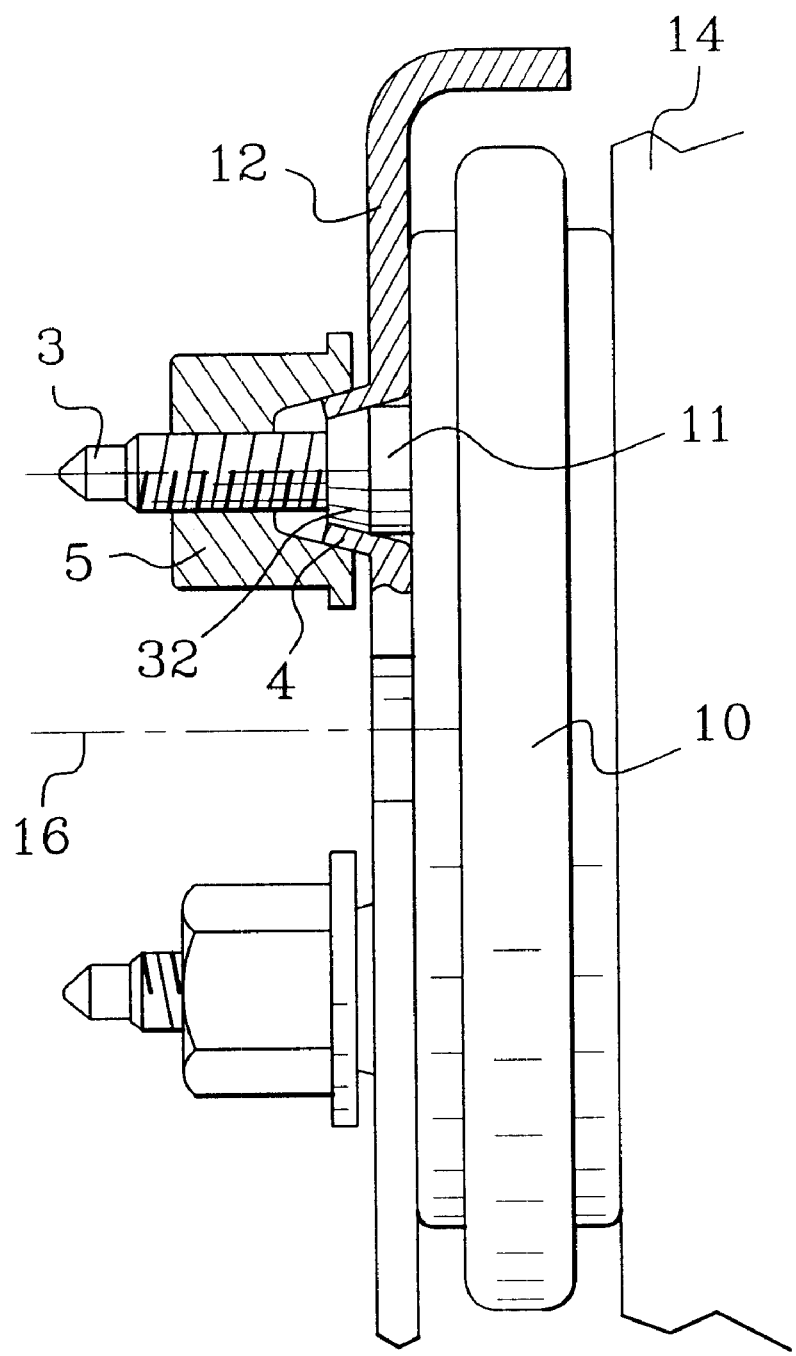
FIG. 3 is a lateral view of the hinge with a partial cross-section of a joining system.

The drawings in FIGS. 2 and 3 illustrate the application of the joining system in compliance with the invention to the assembly of a hinge between an automobile seat pan and back. Hinge mechanism 10, illustrated in a simplified manner in the drawings, is placed between flange 12 of the seat back and flange 14 of the seat pan, to permit, in a way known in itself, adjustment of the seat back. Flange 12 is attached to the hinge mechanism 10 by several joining systems in compliance with the invention. These joining systems are distributed circumferentially around the axis 16 of the hinge.

As can be seen in FIG. 3, the raised collars 4 are formed on flange 12. The studs 3 are attached to the hinge mechanism 10.

The joining system in compliance with the invention is particularly advantageous in this application where these joints can be subjected to substantial loads due to the high moment created in the hinge by the forces applied to the seat back. Furthermore, the fact that the collar can undergo plastic deformation, determined such that the deformation resistance of the collar is less than the force that can be applied to it by tightening the nut, means that the joining system can compensate for any manufacturing variance in the system components, while at the same time creating positive rotational and axial abutment of the hinge mechanism with respect to the seat frames. It also enables, in particular by ensuring that the flange bears flatly against the mechanism, the sheet metal flange of the seat frame to be held rigidly in the attachment zone, even if the sheet is not perfectly flat and rigid.

It will be noted that having a small collar taper apex angle reduces the possibilities of taking up dimensional variations, and conversely, an excessively large apex angle could make it necessary to apply a higher nut tightening torque to compensate for the lower resistance to the turning moment of the hinge, which, through calculations and experience has resulted in the preferred angles mentioned earlier.

The invention is not limited to the method of production and application described above uniquely by way of example. More specifically, it can be used to join more than two parts, and can be applied to numerous types of assembly, especially there are several assembly points, to guarantee a joint that is free of play at each point in spite of the inevitable variations in distances between the different points.

What is claimed is:

1. In an automobile seat, a hinge joining system comprising:
   a seat back flange;
   a seat pan flange;
   a hinge mechanism attached to a selected one of the flanges;
   an assembly fastener component connected to the hinge mechanism and passing through an opening in the selected flange, the opening including a raised frusto-conically tapered ductile collar;
   thrust component means connected to the assembly fastener component, the thrust component means having a bore for radially gripping the raised tapered collar and axially pressing the collar against the selected flange;
   the assembly fastener component including a tapered male section fitting into the tapered collar; and
   wherein the bore of the thrust component means is also tapered for gripping the tapered collar between the bore and the tapered male section and deforming the tapered collar when the thrust component means is pressed against the selected flange.

2. The hinge joining system in accordance with claim 1, wherein the tapered male section has an apex angle that is between 15 and 30 degrees.

3. The hinge joining system in accordance with claim 1, wherein the assembly fastener component is a threaded member and the thrust component means is a mating nut.

4. The hinge joining system in accordance with claim 3, wherein the assembly fastener component is a stud having a head and further wherein the tapered male section is an intermediate bushing that axially abuts the hinge mechanism when the head is joined to said hinge mechanism.

5. The hinge joining system in accordance with claim 4, wherein the head of the stud is riveted to the hinge mechanism.

6. The hinge joining system in accordance with claim 4, wherein the head of the stud is fixed to a boss of the hinge mechanism, with the tapered male section of the stud in axial abutment with the boss.

7. The hinge joining system in accordance with claim 3, wherein the nut has a seat section in which the tapered bore exists.

* * * * *